United States Statutory Invention Registration [19]

[11] Reg. Number: H815

Willis et al. [43] Published: Sep. 4, 1990

[54] LUBRICANT COMPOSITION CONTAINING A VISCOSITY INDEX IMPROVER HAVING DISPERSANT PROPERTIES

[76] Inventors: Carl L. Willis, 15922 Red Willow, Houston, Tex. 77084; Andy M. Arismendi, Jr., 9707 Ravensworth, Houston, Tex. 77031

[21] Appl. No.: 157,355

[22] Filed: Feb. 17, 1988

[51] Int. Cl.[5] ..... C10M 155/02

[52] U.S. Cl. ..... 252/49.6; 252/50; 525/338

[58] Field of Search ..... 252/50; 525/338

[56] References Cited

U.S. PATENT DOCUMENTS

| | | | |
|---|---|---|---|
| Re. 27,145 | 6/1971 | Jones | 260/880 |
| 3,109,871 | 11/1973 | Zelinski et al. | 260/85.1 |
| 3,113,986 | 12/1963 | Breslow et al. | 260/683.9 |
| 3,135,716 | 6/1964 | Uraneck et al. | 260/45.5 |
| 3,175,997 | 3/1965 | Hsieh | 260/85.1 |
| 3,231,635 | 1/1966 | Holden et al. | 260/880 |
| 3,251,905 | 5/1966 | Zelinski | 260/879 |
| 3,265,765 | 8/1966 | Holden et al. | 260/876 |
| 3,322,856 | 5/1967 | Holden et al. | 260/876 |
| 3,390,207 | 6/1968 | Moss et al. | 260/879 |
| 3,598,887 | 8/1971 | Darcy et al. | 260/879 |
| 3,639,517 | 1/1972 | Kitchen et al. | 260/879 |
| 3,639,521 | 2/1972 | Hsieh | 260/880 |
| 3,700,633 | 10/1972 | Wald et al. | 260/880 |
| 3,700,748 | 10/1972 | Winkler | 260/879 |
| 3,763,044 | 10/1973 | Anderson | 252/59 |
| 3,772,196 | 11/1973 | St. Clair et al. | 252/32.7 E |
| 3,965,019 | 6/1976 | St. Clair et al. | 252/59 |
| 3,976,628 | 8/1976 | Halasa et al. | 525/250 |
| 4,033,888 | 7/1977 | Kiovsky | 252/56 D |
| 4,036,910 | 7/1977 | Anderson | 260/879 |
| 4,080,357 | 3/1978 | Gergen et al. | 260/42.18 |
| 4,145,298 | 3/1979 | Trepka | 252/51.5 A |
| 4,174,358 | 11/1979 | Epstein | 525/183 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,238,202 | 12/1980 | Trepka et al. | 44/62 |
| 4,238,202 | 12/1980 | Trepka et al. | 44/62 |
| 4,292,414 | 9/1981 | Saito et al. | 525/255 |
| 4,308,353 | 12/1981 | Saito et al. | 525/74 |
| 4,357,250 | 11/1982 | Hayashi et al. | 252/51.5 A |
| 4,391,949 | 8/1987 | St. Clair | 525/99 |
| 4,409,357 | 10/1983 | Milkovich | 525/314 |
| 4,427,828 | 1/1984 | Hergenrother et al. | 525/66 |
| 4,429,076 | 1/1984 | Saito et al. | 525/57 |
| 4,444,953 | 4/1984 | St. Clair | 525/98 |
| 4,471,099 | 9/1984 | Trepka | 525/338 |
| 4,584,338 | 4/1986 | Liu | 524/504 |
| 4,588,756 | 5/1986 | Bowen | 523/116 |
| 4,594,378 | 6/1986 | Tipton et al. | 524/106 |
| 4,628,072 | 12/1986 | Shiraki et al. | 525/57 |
| 4,657,970 | 4/1987 | Shiraki et al. | 525/57 |
| 4,657,971 | 4/1987 | Shiraki et al. | 525/57 |
| 4,670,173 | 6/1987 | Hayashi et al. | 252/51.5 A |

FOREIGN PATENT DOCUMENTS

| | | |
|---|---|---|
| 0103148 | 8/1983 | European Pat. Off. . |
| 215501 | 7/1986 | European Pat. Off. . |
| 1548464 | 7/1979 | United Kingdom . |

OTHER PUBLICATIONS

"The Chemistry of Organolithium Compounds", B. J. Wakefield, Permagon Press, Oxford, England, 1974, p. 128.

"Advanced Organic Chemistry–Reactions, Mechanisms, and Structure", 3rd Ed., J. March, John Wiley & Sons, New York, 1985, p. 376.

"Maleic Anhydride", B. C. Trivedi, B. M. Culbertson, Plenum Press, New York, 1982, pp. 172–173.

*Primary Examiner*—John F. Terapane
*Assistant Examiner*—Richard Treanor

[57] ABSTRACT

The present invention relates to a lubricant composition containing a minor amount of a thermally stable modified selectively hydrogenated alkenyl arene/conjugated diene copolymer wherein a primary or secondary amine functional group is grafted to the block copolymer primarily in the alkenyl arene blocks thereof.

23 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LUBRICANT COMPOSITION CONTAINING A VISCOSITY INDEX IMPROVER HAVING DISPERSANT PROPERTIES

CROSS-REFERENCE TO RELATED APPLICATIONS

This is related to copending U.S. patent application Ser. No. 766,217, filed Aug. 16, 1985.

FIELD OF THE INVENTION

This invention relates to novel selectively hydrogenated functionalized block copolymers. More particularly, it relates to a novel thermoplastic polymer which when blended with engineering thermoplastics which are condensation polymers, such as polyesters, polyurethanes and polyamides, is expected to enhance the impact toughness of articles made from such blends. Additionally, these block copolymers are expected to find utility as viscosity index improvers and dispersants for lubricants, fuels and the like. The polymer is obtained by modifying a block copolymer composed of a selectively hydrogenated conjugated diene compound and an alkenyl arene compound with a primary or secondary amine containing functional group grafted primarily in the alkenyl arene block.

BACKGROUND OF THE INVENTION

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a selectively hydrogenated conjugated diene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases; a continuous elastomeric phase (blocks B) and a basically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A—B—A rubber to behave like a conventionally vulcanized rubber in the unvulcanized state and is applicable for various uses. For example, these network forming polymers are applicable for uses such as moldings of shoe sole, etc.; impact modifier for polystyrene resins and engineering thermoplastics; in adhesive and binder formulations; modification of asphalt; etc.

Conversely, as the A-B block copolymers have only one A block, domain formation of the A blocks does not lock in the B blocks and their inherent entanglements. Moreover, when the alkenyl arene content is small resulting in a continuous elastomeric B phase. The strength of such polymers is derived primarily from the inherent entanglements of the various B blocks therein and to a lesser extent the inherent entanglements of the A blocks therein. However, the non-network forming polymers have found particular utility as viscosity index improvers (U.S. Pat. Nos. 3,700,748; 3,763,044; 3,772,196; 3,965,019; and 4,036,910). Non-network forming polymers are also utilized in adhesive and binder formulations and as modifiers or plasticizers for polystyrene resins and engineering thermoplastics (U.S. Pat. No. 4,584,338).

Network forming copolymers with a high alkenyl arene compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

Both the network forming (A—B—A) and non-network forming (A—B) polymers are physically crosslinked, these polymers may be handled in thermoplastic forming equipment and are soluble in a variety of relatively low cost solvents.

While in general these block copolymers have a number of outstanding technical advantages, one of their principal limitations lies in their sensitivity to oxidation. This behavior is due to the unsaturation present in the elastomeric section comprising the polymeric diene block. Oxidation may be minimized by selectively hydrogenating the copolymer in the diene block, for example, as disclosed in U.S. Pat. Re. No. 27,145 and the above referenced VI improver patents. For example, prior to hydrogenation, the block copolymers have an A—B or an A—B—A molecular structure wherein each of the A's is an alkenyl-arene polymer block and B is a conjugated diene polymer block, such as an isoprene polymer block or a butadiene polymer block preferably containing 35–55 mole percent of the condensed butadiene units in a 1,2 configuration.

Non-network forming (A—B) block copolymers are especially deficient in applications in which good mechanical integrity and deformation resistance are required. This behavior is a consequence of the lack of inherent entanglements of the various B rubber blocks and to a lesser extent the entanglements of the A blocks therein which controls strength under tensile deformation. Additionally, these non-network forming copolymers, in particular A—B copolymers, are also deficient in viscosity index (VI) improver applications wherein thickening efficiency is lost at higher temperatures. As such, improvement in such properties may be achieved by enhancing the integrity of the alkenyl arene domains and the elastomeric matrix through the incorporation of interacting functional groups along the polymer chain.

Conversely, network forming copolymers are known to have particularly high tensile strengths at room temperature due to the formation of glassy phase arene block domains which act as physical crosslinks locking in the inherent entanglements within the rubbery B block matrix. The mechanical integrity of these domains and the resulting network structure formed appear to control the tensile strengths of these copolymers. Moreover, at elevated temperatures, the mechanical integrity of block copolymers is limited to the integrity of the hard phase arene block domains. For example, network forming copolymers having arene blocks of polystyrene have poor mechanical properties at high temperature which may be attributed to the weakening of the polystyrene domains above its glass transition temperature (Tg) of 100° C. Improvements in the high temperature characteristics of the network forming block copolymers may be achieved by enhancing the integrity of the alkenyl arene domains to higher temperatures.

These selectively hydrogenated block copolymers are further deficient in many applications in which interactions are required between it and other materials. Applications in which improvements in adhesion characteristics may promote improved performance include (1) the toughening of, and dispersion in, polar polymers such as the engineering thermoplastics; (2) the adhesion to high energy substrates in a hydrogenated block copolymer elastomer based high temperature adhesive, sealant or coating materials; and (3) the use of hydrogenated elastomers in reinforced polymer systems. The placement of functional groups onto the block copolymer may provide interactions not possible with hydrocarbon polymers and, hence, may extend the range of applicability of this material.

Many attempts have been made to improve the impact properties of polyamides by adding low modulus modifiers which contain polar moieties as a result of polymerization or which have been modified to contain polar moieties by various grafting techniques. To this end, various compositions have been proposed utilizing such modifiers having nitrogen containing functional groups thereon, for example, Epstein in U.S. Pat. No. 4,174,358; Hergenrother et al. in U.S. Pat. No. 4,427,828; and Beever et al. in U.S. Pat. No. 4,588,756.

Epstein discloses a broad range of low modulus polyamide modifiers which have been prepared by free radical copolymerization of specific monomers with acid containing monomers. Alternatively, Epstein discloses the modification of polymers by grafting thereto specific carboxylic acid containing monomers. The grafting techniques allowed for therein are limited to thermal addition (ene reaction) and to nitrene insertion into C-H bonds or addition to C=C bonds (ethylenic unsaturation). Via these grafting techniques, Epstein may produce modifiers with nitrogen-containing functional groups. With nitrene insertion, the aromatic sulfonyl azides utilized therein are used as a means for grafting a carboxylic acid group onto the modifier. As such, the interaction between the polyamide and the modifier is achieved via the carboxylic acid group of these nitrogen containing functional groups. On the otherhand, when a dicarboxylic acid or derivative thereof (e.g., an anhydride) group is grafted thereon say via thermal addition, the dicarboxylic acid group may either directly interact with the polyamide via a grafting reaction or indirectly interact with the polyamide by first further modifying the dicarboxylic acid group by reacting same with a caprolactam to form a cyclic imide with a pendant polyamide oligomer chain which in turn acts as a compatibilizer with the polyamide or possible transamidation graft site.

Though Epstein does disclose a broad range of polyamide modifiers, Epstein does not disclose or suggest the utilization of hydrogenated copolymers of alkenyl arenes and conjugated dienes nor, more particularly, modified selectively hydrogenated copolymers of alkenyl arenes and conjugated dienes as polyamide modifiers. Furthermore, Epstein relies upon the carboxylic acid portion, as opposed to the nitrogen portion, of the functional groups in the modifiers therein as the active participant in the impact modification of the polyamide.

Hergenrother et al. disclose polyamide compositions which contain a modified partially hydrogenated aromatic vinyl compound/conjugated diene block copolymer as a polyamide modifier. In order to improve the weatherability and resistance to heat aging, Hergenrother et al. partially hydrogenate the block copolymer in their respective blends to an ethylenic unsaturation degree not exceeding 20 percent of the ethylenic unsaturation contained in the block copolymer prior to hydrogenation. Once the block copolymer is partially hydrogenated, the block copolymer is modified by grafting a dicarboxylic acid group or derivative thereof (e.g. anhydride moieties). Hergenrother et al. disclose grafting via thermal addition (ene reaction) utilizing the available residual unsaturation in the block copolymer. As such, Hergenrother et al. retained the deficiencies associated with the reversibility of the ene reaction. The anhydride moieties therein, like in Epstein, are believed to undergo a grafting reaction with the terminal amines of the polyamide to form a cyclic imide, thereby converting the functional group into a nitrogen-containing functional group. However, it is readily apparent that Hergenrother et al. place heavy reliance on these anhydride moieties, as opposed to a nitrogen-containing functional group, to effect the impact modification of the polyamide.

As is readily apparent from the foregoing prior art polyamide compositions utilizing alkenyl arene/conjugated diene block copolymers as polyamide modifiers, improved impact modification of the particular polyamide is achieved via specific interactions, between the modified diene block and the polyamide. Thus, to the extent that impact modification and strength mechanisms rely on the elastomeric properties of the diene block of the copolymer, these properties have been adversely affected by modifying the diene block in this manner.

Beever discloses a polyamide composition containing an oil-soluble organonitrogen compound grafted hydrogenated conjugated diene/monovinylarene copolymer, such as those described in U.S. Pat. No. 4,145,298 to Trepka. The copolymer is characterized as having been prepared by the process which comprises (1) metalating a hydrogenated conjugated diene hydrocarbon/mono vinylarene hydrocarbon copolymer and (2) reacting the resulting metalated hydrogenated copolymer with effective amounts of at least one nitrogen-containing organic compound, thereby preparing the grafted copolymer. The suitable nitrogen containing organic compound are specifically described by the general formula:

$$X—Q—(NR_2^3)_n \text{ or } Y\text{-}[Q—(NR_2^3)_n]_m$$

wherein each $R_2^3$ is the same or different alkyl, cycloalkyl, aryl, or combination thereof, Q is a hydrocarbon radical having a valence of n+1 and is a saturated aliphatic, saturated cycloaliphatic, or aromatic radical, or combination thereof, X is a functional group capable of reacting on a one-to-one basis with one equivalent of polymer lithium, Y is or contains a functional group capable of reacting on a one-to-one basis with one equivalent of polymer lithium, n is at least one, and m is 2 or 3. X includes:

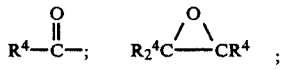

wherein $R^4$ is hydrogen, or an alkyl, cycloalkyl, or aryl radical or combination radical; N≡C—; and $R^3N{=}CH$—. Thus, it is readily apparent that suitable nitrogen-containing organic compounds therein are electrophilic graftable molecules requiring three portions: (1) X, a lithium reactive functional group; (2) $NR_2^3$, the nitrogen containing portion of the molecule (a tertiary amine); and (3) Q, which couple together X and $NR_2^3$. This method of using an electrophilic graftable molecule having an appended amine site as a route to attach amine groups to the block copolymer suffers from the disadvantage that the product of the reaction of X with the lithiated polymer is itself a functional site (a ketone or alcohol for example). The introduction of this second (reactive) site of functionality (with the amine being the other site of functionality) may lead to undesirable effects particularly in the process of Incorporating the required amine functionality.

With respect to viscosity index improvers, many attempts have been made to improve the viscosity index of lubricants and the like by adding modifiers which contain polar moieties as a result of various grafting techniques. The incorporation of nitrogen-containing functional groups onto the modifiers imparts thereto dispersant characteristics in lubricants, fuels and the like. To this end, various viscosity index improver/dispersant modifiers have been proposed having nitrogen-containing functional groups thereon, for example, Kiovsky in G.B. Pat. No. 1,548,464, Hayashi et al in U.S. Pat. No. 4,670,173, and Trepka in U.S. Pat. Nos. 4,145,298 and 4,328,202.

Both Kiovsky and Hayashi et al. disclose a partially or selectively hydrogenated aromatic vinyl compound-/conjugated diene block copolymer to which has been grafted a carboxylic acid group (or anhydride thereof) onto the diene portion of the polymer. The graft is effected via a free radically initiated reaction. Once modified with carboxyl functional groups, the modified polymer is further modified by reacting these carboxyl or functional groups with an amine containing material, e.g. a mono- or polyamine. The so modified polymer contains a nitrogen-containing functional group to impart dispersing characteristics thereto.

Trepka discloses an oil-soluble organonitrogen compound grafted hydrogenated conjugated diene/-monovinylarene copolymer. This same polymer is utilized to impact modify polyamides by Beever et al. in U.S. Pat. No. 4,588,756, previously discussed herein. The disadvantages of utilizing such a polymer for impact modifying polyamides are equally applicable with respect to viscosity index improver and dispersant applications. Of particular importance is the disadvantage related to the introduction of a second (reactive) site of functionality (a ketone or alcohol for example) with the amine being the other site of functionality. This second functional site is particularly susceptible to oxidative attack and cleavage of the amine functional group from the polymer, particularly under the severe conditions encountered in an internal combustion engine. Such an occurrence would be expected to significantly reduce the dispersant activity of the polymer.

On the otherhand, the present invention relates to a thermally stable, modified, selectively hydrogenated conjugated diene/alkenyl arene copolymer grafted with at least one functional group utilizing the metalation process. Herein, the functional groups are amine functional groups which are grafted primarily in the alkenyl arene portions of the copolymer. The introduction of a second site of functionality is avoided by utilizing electrophiles, as opposed to electrophilic graftable molecules such as in Beever. The electrophiles are imines which becomes amine functional groups upon reacting with the lithiated polymer and contacting with a proton source. In this composition, interactions between a condensation polymer and the copolymer are expected to be achieved via the alkenyl arene block.

To those skilled in the art, the degree to which the grafting reaction and phase size reduction occur, thereby promoting interfacial adhesion, together with the distribution of the rubber within the blend typically contribute to impact toughening of the blend. The expected results herein are that functionalizing the alkenyl arene segment will promote covalent bonding between the modified block copolymer and the condensation engineering thermoplastic (ETP), polymers, e.g. a polyamide. Furthermore, the block copolymer is also expected to become well distributed in the polyamide phase.

SUMMARY OF THE INVENTION

According to the present invention, there is provided a thermally stable, selectively hydrogenated, block copolymer to which an amine functional group has been grafted primarily in the alkenyl arene block.

More specifically, there is provided a lubricant composition comprising:

(a) a major amount of a lubricating oil, and (b) a minor effective viscosity improving amount of an oil soluble, functionalized selectively hydrogenated block copolymer to which has been grafted a primary or secondary amine functional group, said functionalized block copolymer comprising (1) a base block copolymer which comprises (i) at least one polymer block A, said A block being at least predominantly a polymerized alkenyl arene block, and (ii) at least one selectively hydrogenated polymer block B, said B block prior to hydrogenation being at least predominantly a polymerized conjugated diene block, (2) wherein substantially all of said amine functional groups are grafted to said base block copolymer on said A blocks.

The functionalized block copolymer is preferably characterized as having been prepared by the process which comprises (i) metalating the base block copolymer;

(ii) reacting the resulting metalated base block copolymer with at least one imine wherein the imine is represented by the general formula

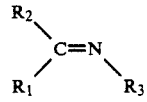

where $R_1$, $R_2$, and $R_3$ are alkyl, cycloalkyl or aryl radicals or a combination thereof; and (iii) contacting the resulting metalated amine with a proton source, such as water or a dilute aqueous acid, thereby preparing the functionalized block copolymer. $R_1$, $R_2$ and $R_3$ may be the same or different radical. Additionally, $R_3$ may be a hydrogen or a silyl radical represented by the general formula:

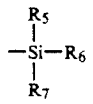

wherein $R_5$, $R_6$ and $R_7$ are the same or different alkyl, cycloalkyl or aryl radicals or a combination thereof, for example, methyl, ethyl, phenyl, etc. There is no known limit on the number of carbon atoms of any of $R_1$, $R_2$, $R_3$, $R_5$, $R_6$ or $R_7$ as far as operability is concerned. Such radicals without acidic hydrogen atoms thereon are particularly preferred to avoid the possibility of deleterious protonation of the metalated (e.g. lithiated) polymer.

Furthermore, the functionalized block copolymer may be linear or branched, with the term "branched" also including symmetric or asymmetric radial and star structures.

Preferably, there is provided the functionalized selectively hydrogenated block copolymer as defined above, wherein (a) each of the A blocks prior to hydrogenation is at least predominantly a polymerized monoalkeny monocyclic arene block having an average molecular weight of about 1,000 to about 125,000, preferably about 1,000 to about 60,000, (b) each of the B blocks prior to hydrogenation is at least predominantly a polymerized conjugated diene block having an average molecular weight of about 10,000 to about 450,000, preferably about 10,000 to about 150,000, (c) the A blocks constitute between about 1 and about 99, preferably between about 2 and about 70, and more preferably between about 20 and about 70 percent by weight of the copolymer, (d) the unsaturation of the B blocks is less than about 10 percent, preferably less than about 5 percent and more preferably at most 2 percent, of the original unsaturation of the B blocks, (e) the unsaturation of the A blocks is greater than about 50 percent, preferably greater than about 90 percent, of the original unsaturation of the A blocks, and (f) the amine functional group is preferably present on the average from about one (1) of said amine functional groups per molecule of said copolymer :o about one (1) of said amine functional groups per aromatic ring of said A block and more preferably on the average from about three (3) of said amine functional groups per molecule of said copolymer to about one (1) of said amine functional groups per aromatic ring of said A block.

For imparting suitable dispersancy to the block copolymers, the effective amount of nitrogen grafted thereto is at least about 0.01 percent by weight based on the base block copolymer, more preferably from about 0.01 to about 5 percent by weight and yet more preferably from about 0.05 to about 0.5 percent by weight.

An effective amount of the functionalized block copolymer herein for dispersing insoluble impurities and for improving viscosity properties normally will be from about 0.01 to about 10 percent by weight based on the total weight of the lubricant, preferably from about 0.5 to about 5 percent by weight.

Preferably, these block copolymers are diluted with a substantially inert, normally liquid organic diluent to form concentrates. These concentrates usually contain from about 5 percent to about 90 percent by weight of the functionalized block copolymer based on the total weight of the concentrate.

A feature of this invention lies in providing modified block copolymers which are thermally stable; have a low residual unsaturation; are processable in solution and/or in the melt; are expected to have improved mechanical properties at room and elevated temperatures over its respective precursor (unmodified) block copolymer, such as tensile strength, and deformation resistance; etc.

Another feature of this invention lies in providing modified block copolymers which are expected to improve the impact resistance of engineering thermoplastics which are condensation products , such as polyesters, polyamides and polyurethanes, when blended therewith.

Yet another feature of this invention lies in providing modified block copolymers which are expected to provide viscosity index improvement in lubricants and the like and dispersancy in lubricants, fuels and the like.

Accordingly, these and other features and advantages of the present invention will become apparent from the following detailed description.

DETAILED DESCRIPTION OF THE INVENTION

Selectively Hydrogenated Block Copolymer Base Polymer

The selectively hydrogenated block copolymers employed in the present invention may have a variety of geometrical structures, since the invention does not depend on any specific geometrical structure, but rather upon the chemical constitution of each of the polymer blocks, and subsequent modification of the block copolymer. The precursor of the block copolymers employed in the present composition are preferably thermoplastic elastomers and have at least one alkenyl arene polymer block A and at least one elastomeric conjugated diene polymer block B. The number of blocks in the block copolymer is not of special importance and the macromolecular configuration may be linear or branched, which includes graft, radial or star configurations, depending upon the method by which the block copolymer is formed.

Typical examples of the various structures of the precursor block copolymers used in the present invention are represented as follow:

(A—B)n (A—B)n A (B—A)n B

[(A—B)p]m X

[(B—A)p]m X

[(A—B)pA]m X and

[(B—A)p B]m X wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 40. Furthermore, the above-mentioned branched configurations may be either symmetrical or asymmetrical with respect to the blocks radiating from X.

A specific subset of the foregoing precursor block copolymers are the non-network forming block copolymers. Once modified pursuant to the present invention, such modified block copolymers are expected to be excellent viscosity index improvers with dispersancy characteristics and are also expected to impact modify engineering thermoplastics which are condensation products.

"Non-network forming block copolymers" means those polymers having effectively only one alkenyl arene polymer block A. Structural configurations included therein are represented as follows:

$$B—A \quad (1)$$

$$B—A—B \quad (2)$$

$$(B—A)_n X \quad (3)$$

$$(B—A)_y X—(B)_z \quad (4)$$

wherein A is a polymer block of an alkenyl arene, B is a polymer block of a conjugated diene, X is a residual group of a polyfunctional coupling agent having two or more functional groups, y and z are, independently, integers of 1 to 20 and n is an integer of 2 to 40. Furthermore, the above-mentioned branched configurations may be either symmetrical or asymmetrical with respect to the blocks radiating from X.

As is readily apparent from the foregoing structures, there is "effectively" only one alkenyl arene polymer block A. In structures (1) and (2) there is only one block A in each. In structures (3) and (4), each of the blocks A are molecularly attached to each other via a polyfunctional coupling agent and as such is in effect only one block A with B blocks radiating out therefrom. Thus, the network structure formed by A—B—A type polymers utilizing the domains is not possible in these non-network forming block copolymers. Typical block copolymers of the most simple configuration (structure (1) above) would be polystyrene-polybutadiene (S-B) and polystyrene-polyisoprene (S-I).

It will be understood that both blocks A and B may be either homopolymer, random or tapered copolymer blocks as long as each block at least predominates in at least one class of the monomers characterizing the blocks defined hereinbefore. For example, blocks A may comprise styrene/alphamethylstyrene copolymer blocks or styrene/butadiene random or tapered copolymer blocks as long as the blocks individually at least predominate in alkenyl arenes. The A blocks are preferably monoalkenyl arene. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alphamethylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B at least predominate in conjugated diene units. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

Preferably, the block copolymers of conjugated dienes and alkenyl arene hydrocarbons which may be utilized include any of those which exhibit elastomeric properties; and those butadiene derived elastomers which have 1,2-microstructure contents prior to hydrogenation of from about 7 to about 100 percent, preferably from ahout 25 to about 65 percent, more preferably from about 35 to ahout 55 percent. Such block copolymers may contain various ratios of conjugated dienes to alkenyl arenes. The proportion of the alkenyl arene blocks is between about 1 and about 99 percent by weight of the multiblock copolymer, preferably between about Z and about 60 percent, more preferably between about 2 and about 55 percent by weight and particularly preferable between about 2 and about 40 percent by weight. When the alkenyl arene content is not more than about 60 percent by weight, preferably not more than about 55 percent by weight, the precursor block copolymer has characteristics as a thermoplastic elastomer; and when the alkenyl arene content is greater than about 60 percent by weight, preferably more than about 70 percent by weight, the precursor block copolymer has characteristics as a resinous polymer.

For viscosity index improving purposes, the alkenyl arene content ranges from about 2 to about 70 and preferably from about 20 to about 70 percent by weight.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights on the order of about 10,000 to about 450,000, preferably about 10,000 to about 150,000. The total average molecular weight of the multiblock copolymer is typically on the order of about 11,000 to about 2,500,000. These molecular weights are most accurately determined by gel permeation chromatography or by gel permeation-low angle light scattering.

The block copolymer may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates.

Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953; the disclosure of which patents are incorporated herein by reference.

Though the afore-mentioned illustrative patents are slanted to producing network forming block copolymers (e.g. A—B—A), the non-network forming block copolymers of the present application may be prepared by an obvious variation or modification of these procedures; for example, (1) sequential polymerization of an A—B or B—A—B block copolymer; (2) utilizing a di-initiator to prepare a B—A—B block copolymer; (3) utilizing polyfunctional coupling agents to couple B—A—Li living copolymer segments to form a $(B—A)_nX$ polymer, where X is the residual portion of the polyfunctional coupling agent incorporated as part of the polymer whose presence therein is of insignificant effect to the properties of the resulting polymer and where n is the number of block copolymer segments or arms attached to X; and (4) similarly utilizing polyfunctional coupling agents to couple B—A—Li living copolymer segments and B—Li living homopolymer or diene copolymer segments to form a $(B—A)_yX(B)_z$ polymer, where X is as before and y and z represent the number of respective segments or arms attached to X.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are preferably hydrogenated to increase their thermal stability and resistance to oxidation. The hydrogenation of these polymers and copolymers may be carried out by a variety of well established processes Including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. Re. 27,145; 3,113,986; 3,700,633; 3,700,748; 3,763,044; 3,772,196; 3,965,019; 4,036,910; and 4,226,952, the disclosures of which are incorporated herein by reference. The polymers and copolymers are hydrogenated in such a manner as to produce hydrogenated polymers and copolymers having a residual ethylenic unsaturation content in the polydiene block of not more than about 20 percent, preferably less than about 10 percent, more preferably less than about 5 percent and yet more preferably at most about 2 percent, of their original ethylenic unsaturation content prior to hydrogenation.

Modified Block Copolymers

The modified block copolymers according to the present invention are Preferably grafted or substituted in the alkenyl arene block by the metalation process as later described herein. Exemplary metalation reactions are given below, utilizing an exemplary styrene unit from a polystyrene segment of a suitable block copolymer:

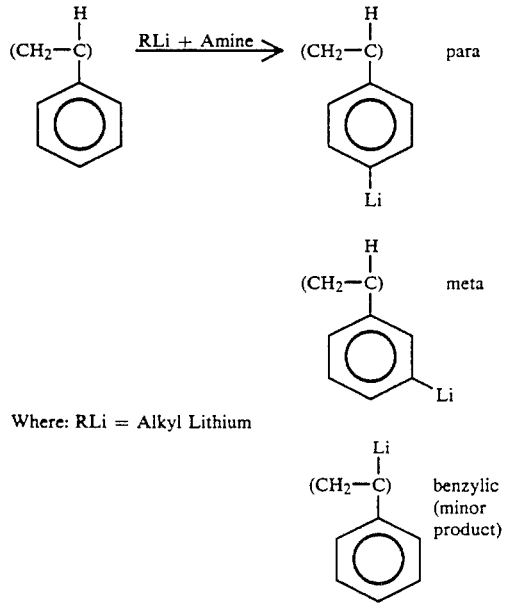

An electrophile, such as an imine is subsequently reacted with the metalated block copolymer and quenched (contacted) with a proton source to yield primary or secondary amine functional groups at the above-indicated metalated sites.

The structure of the substituted block copolymer specifically determined by locating the functionality on the alkenyl arene block gives the block copolymer a substantially greater degree of thermal stability.

Graftable Compounds

In general, any materials having the ability to react with the metalated base polymer are operable for the purposes of this invention.

In order to incorporate functional groups Into the metalated base polymer, electrophiles capable of reacting with the metalated base polymer are necessary. Reactants may be polymerizable or nonpolymerizable; however, preferred electrophiles are nonpolymerizable when reacted with metalated polymers such as those utilized herein.

There are many electrophiles and electrophilic graftable molecules that are (1) capable of reacting with a lithiated block copolymer and (2) contain an amine functional site. As an example, consider an N,N-dialkyl amino-acid ester, an electrophilic graftable molecule. The electrophilic site in

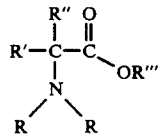

this exemplary molecule is the ester moiety

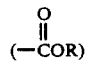

which would be expected to react with the lithiated polymer affording a ketone

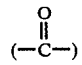

with the appended tertiary amine site

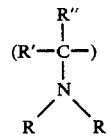

This method of using an electrophilic graftable molecule having an appended amine site as a route to attach amine groups to the block copolymer suffers from the disadvantage that the product of the reaction of the electrophilic portion of the molecule with the lithiated polymer is itself a functional site

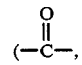

a ketone in this example). In some applications it is undesirable to introduce this second site of functionality in the process of incorporation of the amine.

A method for the direct incorporation of an amine would involve the reaction of the lithiated polymer with a suitable imine (see "The Chemistry of Organolithium Compounds," B. J. Wakefield, Pergamon Press, Oxford, England, p. 109).

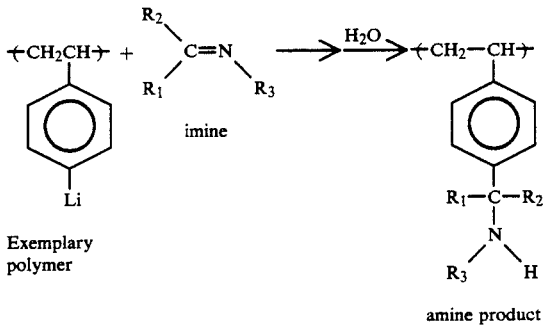

where $R_1$, $R_2$ and $R_3$ are alkyl, cycloalkyl or aryl radicals. Additionally, $R_3$ may be a hydrogen or a silyl radical, such as $-Si(CH_3)_3$, $-Si-(CH_2-CH_3)_3$ and $-Si-(C_6H_5)_3$. As shown in the above equation, this method would introduce an amine functional site (in particular, a primary or secondary amine functional site) without the undesirable side effect of introducing a second functional species.

A block copolymer having a primary or secondary amine functional sites would be expected to react with a condensation polymer, such as polyesters, polyamides, and polyurethanes, via a nucleophilic substitution reaction at an activated carboxyl carbon center as found in many condensation polymers, for example, via the transamidation reaction as outlined below. Suitable polyesters, polyamides, and polyurethanes are disclosed in U.S. Pat. Nos. 4,080,357; 4,429,076; 4,628,072; 4,657,970; and 4,657,971, the disclosure of which are herein incorporated by reference.

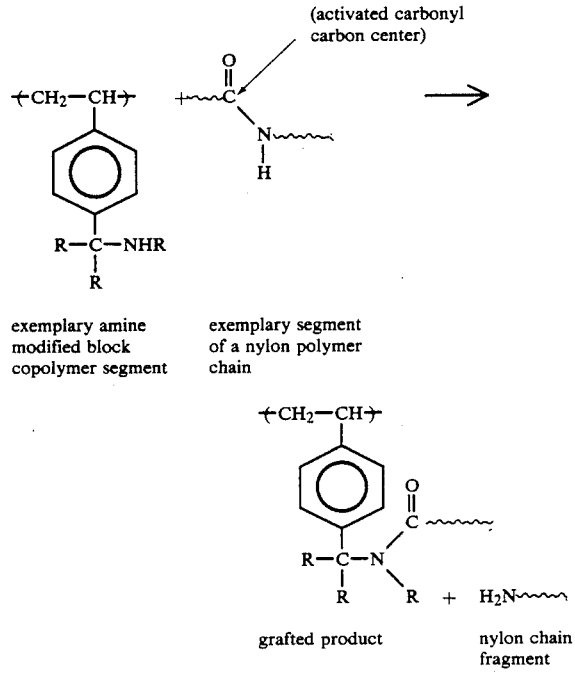

where the wavy lines represent the rest of the polyamide chain in a simplified manner. (see "Advanced Organic Chemistry-Reactions, Mechanisms, and Structure," 3rd Ed., J. March, John Wiley & Sons, New York, 1985, p. 376 and references therein). In this way, a nylon polymer could be covalently grafted onto the modified block copolymers. It is noted at this point that the foregoing reaction requires a primary or secondary amine—a tertiary amine would be inoperative.

The quantity of amine functional groups in the modified block copolymer is dependent on the content and the aromatic structure of the alkenyl arene therein. Once these parameters are fixed, the number of such groups present is dependent on the degree of functionality desired between a minimum and maximum degree of functionality based on these parameters. The minimum degree of functionality corresponds on the average at least about one (1), preferably at least about three (3), amine functional groups per molecule of the block copolymer. It is presently believed that the addition of about one (1) electrophile per aromatic ring of the A blocks is limiting. Thus, if the electrophile imine ($R_1R_2C{=}NR_3$) which contains only one amine functional group is used, this translates to about one (1) amine group per aromatic ring as a maximum functionality level. Preferably, the functionality level is on the average from about one (1) amine functional groups per molecule of the copolymer to about one amine functional group per aromatic ring of the A block, and more preferably on the average from about three (3) amine functional groups per molecule of the copolymer to about one amine functional group per aromatic ring of the A block.

The block copolymers, as modified, may still be used for any purpose for which an unmodified material (base polymer) was formerly used. That is, they may be used for adhesives and sealants, modifiers for lubricants, fuels and the like, or compounded and extruded and molded in any convenient manner.

Preparation of the modified Block Copolymers

The polymers may be prepared by any convenient manner. Preferably, the polymer is prepared such that the functional groups are incorporated into the block copolymer primarily on the aromatic portion of the alkenyl arene block via metalation.

Metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and may also be a saturated cyclic hydrocarbon radical of e.g. 5 to 7 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product metalated polymer alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond (2) at a carbon to which an aromatic is attached, (3) on an aromatic group, or (4) in more than one of these positions. In the metalation of saturated polymers having aromatic groups as is preferably the case herein, the metalation will occur primarily on an aromatic group and as a minor product at a carbon to which an aromatic is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $R_2N—(CH_2)_yNR_2$ in which each R can be the same or different, straight- or branched-chain alkyl group of any chain length containing up to 20 carbon atoms, or more, all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine and the like.

Tertiary monoamines such as triethylamine are generally not as effective in the lithiation reaction. However, bridgehead monoamines such as 1-azabicyclo[2.2.-2]octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to about 20:1. Solvents such as chlorinated hydrocarbons, ketones, and alcohols, should not be used because they destroy the lithiating compound.

Polar metalation promotors may be present in an amount sufficient to enable metalation to occur, e.g. amounts between about 0.01 and about 100 or more preferably between about 0.1 to about 10 equivalents per equivalent of lithium alkyl.

The equivalents of lithium employed for the desired amount of lithiation generally range from such as about 0.001 to about 3.0 per alkenyl arene hydrocarbon unit in the copolymer, presently preferably about 0.01 to about 1.0 equivalents per alkenyl arene hydrocarbon unit in the copolymer to be modified. The molar ratio of active lithium to the polar promoter can vary from such as about 0.01 to about 10.0. A preferred ratio is about 0.5 to about 2.0.

The amount of lithium alkyl employed can be expressed in terms of the lithium alkyl to alkenyl arene hydrocarbon molar ratio. This ratio may range from a value of 1 (one lithium alkyl per alkenyl arene hydrocarbon unit) to as low as $1\times10^{-3}$ (1 lithium alkyl per 1000 alkenyl arene hydrocarbon units).

The process of lithiation can be carried out at temperatures in the range of such as about −70° C. to about +150° C., presently preferably in the range of about 25° C. to about 75° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally, the time can range from a few seconds to about 72 hours, presently preferably from about 1 minute to about 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species are selected from the class of molecules called electrophiles and must contain functional groups capable of undergoing nucleophilic attack by a lithium anion. Specifically, the electrophiles called imines which become the desired amine are of interest in the present invention. As such, the modified block copolymer herein is the reaction product of an electrophile with an activated base (unmodified hydrogenated) block copolymer primarily at lithium anion sites on the aromatic substrates thereof, as opposed to the reaction product of an electrophile (strong Lewis acid) with an unactivated base block copolymer on the aromatic substrates thereof.

Preparation of Blends with Engineering Thermoplastics

The toughened thermoplastic polymer compositions of the present invention can be readily prepared by using any conventional mixing apparatus which is normally used for mixing or blending of polymer substances. Examples of such apparatus are single or multiple screw extruders, mixing rollers, Brabender, Banbury mills, kneaders and the like. Alternatively, the blends may be made by coprecipitation from solution, blending or by dry mixing together of the components, followed by melt fabrication of the dry mixture by extrusion.

Blends of the modified block copolymer of the present invention with engineering thermoplastics (ETP) which are condensation products, e.g., polyamides, polyesters and polyurethanes, may be prepared by melt-blending the desired proportion of ETP, ranging from about 1 percent to about 99 percent, with the desired proportion of the modified block copolymer, correspondingly ranging from about 99 percent to about 1 percent, respectively. With these ranges, ETP/modified block copolymer blends utilizing the modified block copolymer of :he present invention can be a resinous composition a rubbery composition or a leather-like composition according to the ratio of the thermoplastic polymer as the component (a) relative to the modified block copolymer as the component (b) and the alkenyl arene content of the base block copolymer of the modified block copolymer as the component (b). In the case where a resinous composition is obtained, when the alkenyl arene content of the base block copolymer is over 60% by weight up to 99% inclusive by weight, preferably 65 to 90% by weight, the component (a)/component (b) weight ratio is adjusted in the range of from 90/10 to 5/95, preferably from 85/15 to 10/90, more preferably from 80/20 to 15/85, and when the alkenyl arene content of the base block copolymer is 1 to 60% by weight, preferably 10 to 55% by weight, more preferably 15 to 50% by weight, the component (a)/component (b) weight ratio is adjusted in the range of from 50/50 up to 99/1 inclusive, preferably from 60/40 to 95/5, more preferably from 70/30 to 90/10. When the amount of the component (b) is too small and below the above range, no substantial effect of improving the impact resistance or paint adhesion is expected and when the amount of the component (b) is too large, the rigidity is expected to be degraded. In the case where a rubbery or leather-like composition is prepared, when the alkenyl arene content of the base block copolymer is 1 to 60% by weight, preferably 10 to 55% by weight, more preferably 15 to 55% by weight, the component (a)/component (b) weight ratio is adjusted in the range of from 1/99 to less than 50/50, preferably from 5/95 to 40/60, more preferably from 10/90 to 30/70. When the amount of the component (a) is too small and below the above range, no substantial improvement of the composition as a rubbery or leather-like composition can be attained. When the amount of the component (a) is too large, the rubbery or leather-like characteristics are lost and the composition becomes resinous.

The impact properties of the resinous blends utilizing the modified block copolymer of this invention are believed improved as characterized by expected higher notched Izod value over the polyamide alone or in a blend with the base (unmodified hydrogenated) copolymer, particularly when the alkenyl arene content of the block copolymer is from about 1 to about 60% by weight. The amount of functionality in the modified block copolymer employed in such compositions will differ with the degree of impact properties desired. Within the broad range of 50/50 up to 99/1 inclusive (component (a)/component (b) though not likely to correspond to the foregoing commercially preferably ranges, blends considered to be "super-tough" are expected to be attainable. A blend is considered to be "super-tough" herein when its ⅛" Notched Izod at room temperature is in excess of 10 ft-lb/in and the blend experiences ductile failure, as opposed to brittle failure.

The improvement in toughness of such compositions is related to the amount of adherent sites in the modified block copolymer component and the degree of block copolymer distribution or dispersion.

The mechanism of adhesion and the role of the copolymer/ETP interface to promote rubber (block copolymer) distribution or dispersion is not entirely understood. However, it is believed that the grafting reaction and rubber dispersion are interrelated. To some extent, enhancing the extent of reaction is expected to facilitate rubber distribution or dispersion. Moreover, it is believed that by increasing the block copolymer-/ETP interface more sites are made available for the unknown mechanism herein to operate upon. As for the morphology of the articles made from such blends, it is unknown whether the block copolymer may be continuous, partially continuous or dispersed within the ETP.

Blends with Non-reactive Thermoplastic Polymers

Similarly, polymer compositions containing the modified block copolymer of the present invention may also contain thermoplastic polymers which are not reactive with the modified block copolymer therein. The non-reactive thermoplastic polymers are preferably non-polar, such as styrene polymers and olefin polymers, which are present as a separate and preferably dispersed phase therein. These thermoplastic polymers can optionally be incorporated into the present polymer compositions to improve the processability of the composition without substantially detracting from the essential character of the modified block copolymer therein. The amount of the non-reactive thermoplastic polymer is preferably 100 parts by weight or less, more preferably 1 to 50 parts by weight based on 100 parts by weight of the continuous phase, modified block copolymer.

The styrene polymers are polymer substances containing 50% by weight or more of styrene, such as polystyrene, styrene-α-methylstyrene copolymers, butadiene-styrene block copolymers and hydrogenated derivatives thereof, isoprene-styrene block copolymers and hydrogenated derivatives thereof, rubber modified high impact polystyrene, and mixtures thereof.

The olefin polymers are polymer substances containing 50% by weight or more of an olefin monomer unit containing ethylene, propylene, butene and the like. Typical examples of such polymers are low-density polyethylene, high density polyethylene, polypropylene, polybutene, ethylene-propylene copolymers and the like, including mixtures thereof.

The polymer compositions containing the modified block copolymer of the present invention may further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers may be incorporated into these composition at any stage in the preparation of the thermoplastic composition. Preferably, the stabilizers are included early to preclude the initiation of degradation before the composition can be protected. Such stabilizers must be compatible with the composition.

Compositions consisting essentially of or incorporating the modified block copolymer of the present invention can be molded or formed into various kinds of useful articles by using conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, footwear, medical equipment and accessories, packaging materials, building materials and the like.

Viscosity Index Improver/Dispersant

The modified block copolymers of the present invention are expected to be useful as additives for lubricants, in which they would function primarily as dispersants and viscosity modifiers. These polymers may be employed in a variety of lubricants based on diverse oils of lubricating viscosity, including natural and synthetic lubricating oils and mixtures thereof. Examples of such lubricating oils are disclosed in U.S. Pat. Nos. 4,145,298; 4,357,250; and 4,670,173, the disclosures of which are herein incorporated by reference. An illustrative list of such lubricants include crankcase lubricating oils for spark-ignited and compression-ignited internal combustion engines, including automobile and truck engines, two-cycle engines, aviation piston engines, marine and railroad diesel engines, and the like. Such lubricant compositions may also be used in gas engines, stationary power engines and turbines and the like. Automatic transmission fluids, transaxle lubricants, gear lubricants, metal-working lubricants, hydraulic fluids and other lubricating oil and grease compositions may also benefit from the incorporation therein of the modified block copolymers of this invention.

The modified block copolymer of the present invention preferably contains an effective amount of nitrogen for imparting suitable dispersancy to the block copolymers which are suitable as viscosity index improvers. Such modified block copolymers are preferably non-network forming block copolymers to which has been grafted the effective amount of nitrogen via a nitrogen-containing functional group, which herein is an amine group. The effective amount of nitrogen grafted thereto is at least about 0.01 percent by weight based on the base block copolymer more preferably from about 0.01 to ahout 5 percent by weight and yet more preferably from ahout 0.05 to about 0.5 percent by weight. Commercially available non-network forming base block copolymers suitable for modification are available from Shell Chemical under the marks Shellvis® 40 and 50.

Generally, the lubricants of the present invention contain an effective amount of the modified block copolymer of the present invention for dispersing insoluble impurities and for improving viscosity properties. Normally, this amount will be from about 0.01 to about 10 percent by weight based on the total weight of the lubricant preferably from about 0.5 to ahout 5 percent by weight. Formulations for different lubricant applications are known in the art, for example, those given in U.S. Pat. No. 4,145,298, particularly in column 10, lines 16 to 32, the disclosure of which are herein incorporated by reference.

The lubricants of the present invention are also contemplated to use other additives in combination with the modified block copolymers of this invention. Such additives include, for example, auxiliary detergents and dispersants of the ash-producing or ashless type, corrosion- and oxidation-inhibiting agents, pour point depressing agents, extreme pressure agents, color stabilizers and anti-foam agents. Examples of such additives are disclosed in U.S. Pat. Nos. 4,145,298; 4,357,250; and 4,670,173, the disclosures of which are herein incorporated by reference.

The modified block copolymers of this invention may be added directly to the lubricant. Preferably, however, these block copolymers are diluted with a substantially inert, normally liquid organic diluent such as those disclosed in U.S. Pat. Nos. 4,145,298; 4,357,250; and 4,594,378, the disclosures of which are herein incorporated by reference. These concentrates usually contain from about 5 to about 90 percent by weight of the modified block copolymer of the present invention based on the total weight of the concentrate. These concentrates may also contain, in addition, at least one other additive known in the art or described hereinabove.

Additionally, the modified block copolymer is expected to find utility as a gasoline additive. Formulation guidelines and other additives included therein are disclosed, for example, in U.S. Pat. No. 4,328,202 (Trepka et al), the disclosure of which is herein incorporated by reference.

To assist those skilled in the art in the practice of this invention, the following Prophetic Examples are set forth as illustrations. It is to be understood that in the specification and claims herein, unless otherwise indicated, when the amount of the ETP or block copolymer is expressed in terms of percent by weight, it is meant percent by weight based on the total amount of these materials. Furthermore, it is to be understood that, unless otherwise indicated, when the amount of amine functional groups is expressed in terms of percent by weight (% w), it is meant percent by weight based on the base block copolymer. Injection molded bars of these compositions may be tested using the following test procedures in the dry-as-molded state:

Notched Izod toughness: at each end ASTM D-256
Flexural Modulus: ASTM D-790

EXAMPLES OF THE INVENTION

Having thus broadly described the present invention, it is believed that the same will become even more apparent by reference to the following prophetic examples. It will be appreciated, however, that the examples are presented solely for the purposes of illustration and should not be construed as limiting the invention.

EXAMPLE 1

Modified Block Copolymer-Amine Functionality

The formation of block copolymers having amine functionality in the styrene segment of the copolymer would be envisioned to proceed in two steps-(1) lithiation of the starting block copolymer followed by (2) reaction with an arylimine. Aqueous work-up of the product would afford a block copolymer having secondary amine functionality in the styrene segment of the polymer chain.

A suitable hypothetical base block copolymer for this reaction would be an anionically polymerized styrene-butadiene-styrene (7,700–36,100–7,700 block molecular weights) block copolymer having a 1,2-butadiene addition content greater than 35% which had been selectively hydrogenated to afford a styrene-ethylene/butylene-styrene block copolymer of the same molecular weight bu( having less than 5% of the ethylenic (C=C) unsaturation of the starting diene polymer. This material, Polymer A, would be carried forward in the lithiation reaction using the following procedure.

A 5% (wt/wt) solution of Polymer A in cyclohexane (3100 lb) would be treated, in a closed vessel under nitrogen, with the metalation promoter, N,N,N',N'-tetramethylethylenediamine (TMEDA) (14 lb, 55 mol) and a titration indicator, 1,1-diphenylethylene (21 g, 0.1 mol). This solution would be heated with stirring to 50° C. and titrated with s-butyllithium solution to remove impurities. At the endpoint of the titration, a slight excess of s-butyllithium reagent would react with the indicator forming a benzylic anion which would give the solution a yellow/orange color; the persistence of this color would be taken as an indication that the solution was now anhydrous and anaerobic. These conditions would be maintained throughout the rest of the experiment.

The metalation reagent, s-butyllithium (41 lb of a 12% (wt/wt) solution in cyclohexane, 35 mo), would be added to the reaction mixture over a period of 15 minutes. The lithiated polymer cement would be quite viscous and yellow in color. An aliquot of the cement would be removed and treated with an excess of $D_2O$. This procedure places a deuterium atom on the polymer at sites which had been lithiated. Analysis of the deuterated polymer using a Deuterium NMR technique would be expected to show that about 89% of the deuterium was attached to the aromatic ring. Appropriate control experiments would show that the remainder of the deuterium label was at benzylic centers (about 5%) in the polystyrene segment and at allylic centers (about 6%) in the rubber of the polymer. These results would show that the polymer was lithiated principally in the styrene blocks (at least 94%).

The procedure for the reaction of lithiated polymer A with an arylimine is a modification of a procedure for the reaction of non-polymeric lithium alkyls with benzophenone N-phenylimine as described on p. 109 in "The Chemistry of Organolithium Compounds," B. J. Wakefield, Pergamon Press, Oxford, England, 1974 (see also references therein).

After 1 hour in the lithiation reactor (60° C.), the metallated polymer cement would be transferred to a closed vessel containing benzophenone N-phenylimine (9,900 g, 38.5 mol) in anhydrous tetrahydrofuran (THF) (about 380 gal). The lithiated polymer cement would be introduced below the surface of the imine/THF mixture. While reaction would likely be instantaneous, the mixture would be stirred at room temperature for 4 hrs. The reactor product would be neutralized by the addition of acetic acid to a phenolphthalein endpoint. The product, Polymer B, would be isolated by steam coagulation and dried at 50°-60° C. in a vacuum oven. An aliquot of isolated Polymer B would be analyzed for N (nitrogen) content using a chemiluminescence technique. Analysis would be expected to find about 0.36% wt polymer bound N. This level of functionality would correspond to 13 amine sites per polymer chain. Polymer B would be expected to be an laminated block copolymer having about 13 phenyl amine sites distributed between the two polystyrene end segments.

EXAMPLE 2

Nylon 6,6/Modified Block Copolymer Blends

In this example, the modified block copolymer would be used as an impact modifier in an ETP which is a condensation product, e.g. a polyamide. The thermoplastic Polyamide to be used in this example would be a commercial nylon 6,6, Zytel® 101, a molding grade nylon available from Dupont. Prior to all processing steps, the nylon 6,6 and its blend would be dried at 60° C. for four (4) hours under vacuum with a nitrogen purge. The compositions would have a fixed block copolymer to nylon ratio of 30:70. The samples which would be prepared would utilize the base-block copolymer (control, Polymer A) and modified block copolymer with 13 amine functionality sites per molecule (Polymer B).

Blends of nylon 6,6 with both unmodified and modified block copolymer would be prepared in a 30 mm diameter corotating twin screw extruder. The blend components would be premixed by tumbling in polyethylene bags, and then would be fed into the extruder. The extruder melt temperature profile would be about 240° C. in the feed zone, about 270° in the barrel, and about 250° C. at the die. A screw speed of 350 rpm would be used. The extrudate would be pelletized. Injection molded test specimens would be made from pelletized extrudate using an Arburg injection molder (Model number 221-55-250). Injection temperatures and pressures of about 260° C. to about 300° C. and about 800 psig to about 1000 psig, respectively, would be employed during the processing operations.

The blend containing the amine functionality block copolymer (Polymer B) would be expected to possess superior impact properties over those blends containing the unmodified base block copolymer (Polymer A). Additionally, improvements in Impact toughness of the modified block copolymer/nylon blends would not be expected to sacrifice or compromise the flexural modulus when compared to those blends containing the unmodified base block copolymer.

EXAMPLE 3

Nylon 6/Modified Block Copolymer Blends

In this example, the modified block copolymer would be combined with Nylon 6 (Capron 8200 from Allied) (an ETP which is a condensation product) to form an impact resistant polyamide blend composition. Prior to all processing steps, the Nylon 6 and its blends would be dried at 60° C. for four hours under vacuum with a nitrogen purge. The compositions would have a fixed block copolymer to nylon ratio of 30:70. Specimens utilizing only the polyamide and a 70:30 ratio of polyamide to unmodified block copolymer A would be prepared as controls. Polymer B would be utilized as the modified block copolymer at the same ratio of polyamide to block copolymer.

Blends of the polyamide with both unmodified and modified block copolymer would be prepared in a Haakee 30mm diameter corotating twin screw extruder. The blend components would be premixed by tumbling in polyethylene bags and then would be fed into the extruder. The extruder melt temperature profile would be about 220° C. in the feed zone, about 245° C. in the barrel and about 215° C. at the die. A screw speed of about 350 rpm would be used. Injection molded test specimens would be made from pelletized extrudate using an Arburg injection molder (Model number 221-55-250). Injection temperatures and pressures of about 240° C. to about 270° C. and about 600 psig to about 1000 psig, respectively, would be employed during the processing operations.

Improvements in impact resistance of the Nylon 6 blends would be expected when the modified block copolymer is utilized over those blends containing the unmodified block copolymer. Moreover, the flexural modulus of the modified block copolymer/polyamide blend is not expected to be compromised with the enhancement of impact toughness. The modified block copolymer containing amine functionality is expected to show utility as an impact modifier for polyamide resins.

EXAMPLE 4

Polyester/Modified Block Copolymer Blends

In this example, modified block copolymer would be combined with a polyester (an ETP which is a condensation product) such as poly(butylene terephthalate) (PBT, e.g. Valox® 310 available from GE) to form an impact resistant polyester blend composition. Prior to all processing steps, the PBT and its blends would be dried at 60° C. for four hours under vacuum with a nitrogen purge. The compositions would have a fixed block copolymer to PBT ratio of 30:70. Specimens utilizing only the PBT and a 70:30 ratio of PBT to unmodified block copolymer A would be prepared as controls. Polymer B would be utilized as the modified block copolymer at the same ratio of PBT to block copolymer.

Blends of the PBT with both unmodified and modified block copolymer would be prepared in a Haakee 30 mm diameter corotating twin screw extruder. The blend components would be premixed by tumbling in polyethylene bags and then would be fed into the extruder. The extruder melt temperature profile would be about 230° C. in the feed zone, about 240° C. in the barrel and about 240° C. at the die. A screw speed of about 350 rpm would be used. Injection molded test specimens would be made from pelletized extrudate using an Arburg injection molder (Model number 221-55-250). Injection temperatures and pressures of about 220° C. to about 240° C. and about 800 psig to about 1200 psig, respectively, would be employed during the processing operations.

Improvements in impact resistance of the polyester blends would be expected when the modified block copolymer is utilized over those blends containing the unmodified block copolymers. Moreover, the flexural modulus of the modified block copolymer blend is not expected to be compromised with the enhancement of impact toughness. The modified block copolymer containing amine functionality is expected to show utility as an impact modifier for polyester resins.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A lubricant composition comprising:

(a) a major amount of a lubricating oil; and (b) a minor effective viscosity improving amount of an oil soluble, functionalized selectively hydrogenated block copolymer to which has been grafted amine functional groups, said functionalized block copolymer comprising:

(1) a base block copolymer which comprises (i) at least one polymer block A, said A block being at least predominantly a polymerized alkenyl arene block, and (ii) at least one selectively hydrogenated polymer block B, said B block prior to hydrogenation being at least predominantly a polymerized conjugated diene block, and (2) wherein substantially all of said amine functional groups are grafted to said base block copolymer on said A blocks, and (3) wherein said amine functional groups are represented by the general formula

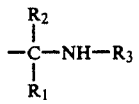

wherein $R_1$ and $R_2$ are the same or different alkyl, cycloaryl or aryl radicals and wherein $R_3$ is a hydrogen, alkyl, cycloalkyl, aryl or silyl radical.

2. The composition according to claim 1, wherein said minor effective amount is from about 0.01 to about 10 percent by weight based on the total weight of said composition.

3. The composition according to claim 1, wherein said amine functional groups are present in an amount such that the nitrogen content of said functionalized block copolymer is at least about 0.01 percent by weight on said base block copolymer.

4. The composition according to claim 3, wherein the nitrogen content of said functionalized block copolymer is from about 0.01 to about 5 percent by weight based on said base block copolymer.

5. The composition according to claim 1, wherein said copolymer has a structure selected from the group consisting of A—B, B—A—B, $(B—A)—_nX$, and $(B—A)—_yX—(B)_z$ and $(B—A)—_yX—(A)_z$ wherein X is a residual group of a polyfunctional coupling agent having two or more functional groups, y and z are, independently integers of 1 to 20 and n is an integer of 2 to 40.

6. The composition according to claim 1, wherein said composition has a branched structure.

7. The composition according to claim 1, wherein said composition has a linear structure.

8. The composition according to claim 2, wherein (a) each of said A blocks prior to hydrogenation is at least predominantly a polymerized monoalkenyl monocyclic arene block having an average molecular weight of about 1,000 to about 125,000, (b) each of said B blocks prior to hydrogenation is at least predominantly a polymerized conjugated diene block having an average molecular weight of about 10,000 to about 450,000, (c) said A blocks constituting about 2 to about 70 percent by weight of said base block copolymer, (d) the residual ethylenic unsaturation of said B block is less than about 10 percent of the ethylenic unsaturation of said B blocks prior to hydrogenation, and (e) the residual aromatic unsaturation of said A blocks is greater than about 90 percent of the aromatic unsaturation of said A block prior to hydrogenation.

9. The composition according to claim 8, wherein said A blocks constitute about 20 to about 70 percent by weight of said base block copolymer.

10. The composition according to claim 8, wherein prior to hydrogenation:

(a) said A block is polymerized styrene and (b) said B block is selected from the group consisting of polymerized isoprene, polymerized butadiene, and polymerized isoprene and butadiene copolymer.

11. The composition according to claim 10, wherein said B block is polymerized butadiene block having a 1,2 content of between about 35 percent and about 55 percent.

12. The composition according to claim 11, wherein said polymerized butadiene block has an average molecular weight of between about 10,000 to about 150,000.

13. The composition according to claim 12, wherein the residual ethylenic unsaturation of said polymerized butadiene block is less than about 5 percent of the ethylenic unsaturation present prior to hydrogenation.

14. The composition according to claim 13, wherein the residual ethylenic unsaturation of said polymerized butadiene block is at most 2 percent of the ethylenic unsaturation present prior to hydrogenation.

15. The composition according to claim 14, wherein said polymerized styrene block has an average molecular weight of between about 1,000 and about 60,000.

16. The composition according to claim 15, wherein prior to functionalization said base block copolymer is a polystyrene-poly(ethylene/butylene) diblock copolymer.

17. The composition according to claim 15, wherein prior to functionalization said base block copolymer is a polystyrene-poly(ethylene/butylene)-polystyrene block copolymer.

18. The composition according to claim 10, wherein said B block is a polymerized isoprene block.

19. The composition according to claim 18, wherein said polymerized isoprene block has an average molecular weight of between about 10,000 to about 150,000.

20. The composition according to claim 19, wherein the residual ethylenic unsaturation of said polymerized isoprene block is less than about 5 percent of the ethylenic unsaturation present prior to hydrogenation.

21. The composition according to claim 20, wherein the residual ethylenic unsaturation of said polymerized isoprene block is at most about 2 percent of the ethylenic unsaturation present prior to hydrogenation.

22. The functionalities block copolymer according to claim 21, wherein prior to functionalization said base block copolymer is a polystyrene-poly(ethylene/propylene) diblock copolymer.

23. The composition according to claim 21, wherein prior to functionalization said base block copolymer is a polystyrene-poly(ethylene/propylene)-polystyrene block copolymer.

* * * * *